(12) United States Patent
Helman et al.

(10) Patent No.: US 9,037,828 B2
(45) Date of Patent: May 19, 2015

(54) TRANSFERRING STORAGE RESOURCES BETWEEN SNAPSHOT STORAGE POOLS AND VOLUME STORAGE POOLS IN A DATA STORAGE SYSTEM

(75) Inventors: Haim Helman, Herzliya (IL); Omri Palmon, Tel Aviv (IL); Ofir Zohar, Alfe-Menashe (IL); Lior Segev, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1206 days.

(21) Appl. No.: 12/192,239

(22) Filed: Aug. 15, 2008

(65) Prior Publication Data

US 2009/0019251 A1    Jan. 15, 2009

Related U.S. Application Data

(63) Continuation-in-part of application No. 11/485,775, filed on Jul. 13, 2006, now Pat. No. 8,069,191.

(51) Int. Cl.
| | |
|---|---|
| G06F 12/00 | (2006.01) |
| G06F 13/00 | (2006.01) |
| G06F 13/28 | (2006.01) |
| G06F 17/30 | (2006.01) |
| G06F 7/00 | (2006.01) |

(52) U.S. Cl.
CPC ... G06F 17/30138 (2013.01); *Y10S 707/99956* (2013.01); *Y10S 707/99957* (2013.01)

(58) Field of Classification Search
None
See application file for complete search history.

(56) References Cited

U.S. PATENT DOCUMENTS

| | | | |
|---|---|---|---|
| 5,682,195 A | 10/1997 | Hendricks et al. | |
| 7,028,158 B1 * | 4/2006 | Beatty et al. | 711/202 |
| 7,103,731 B2 * | 9/2006 | Gibble et al. | 711/156 |
| 7,225,208 B2 | 5/2007 | Midgley et al. | |
| 7,243,094 B2 | 7/2007 | Tabellion et al. | |
| 7,249,179 B1 * | 7/2007 | Romero et al. | 709/226 |
| 7,373,366 B1 * | 5/2008 | Chatterjee et al. | 1/1 |
| 7,937,421 B2 | 5/2011 | Mikesell et al. | |
| 2003/0220948 A1 * | 11/2003 | Green et al. | 707/204 |
| 2003/0220951 A1 | 11/2003 | Muthulingam et al. | |
| 2004/0044827 A1 | 3/2004 | Carlson et al. | |
| 2004/0044855 A1 * | 3/2004 | Carlson et al. | 711/154 |
| 2004/0098383 A1 | 5/2004 | Tabellion et al. | |
| 2005/0055603 A1 | 3/2005 | Soran et al. | |
| 2005/0246401 A1 * | 11/2005 | Edwards et al. | 707/205 |
| 2006/0069861 A1 | 3/2006 | Amano | |
| 2006/0282485 A1 * | 12/2006 | Aggarwal et al. | 707/206 |
| 2007/0168634 A1 | 7/2007 | Morishita et al. | |
| 2008/0209104 A1 | 8/2008 | Tanaka et al. | |

\* cited by examiner

*Primary Examiner* — Jared Rutz
*Assistant Examiner* — Marwan Ayash
(74) *Attorney, Agent, or Firm* — Griffiths & Seaton PLLC (57) ABSTRACT

A method for data storage, including configuring in a data storage system a volume storage pool as data storage resources available for allocation of volumes in the data storage system. The method also includes defining a threshold value for the volume storage pool. When the allocation of the volumes causes the threshold value to be crossed, the method includes performing an action for managing the volume storage pool.

21 Claims, 5 Drawing Sheets

TRANSFERRING STORAGE RESOURCES BETWEEN SNAPSHOT STORAGE POOLS AND VOLUME STORAGE POOLS IN A DATA STORAGE SYSTEM

CROSS-REFERENCE TO RELATED APPLICATION

This application is a continuation-in-part of U.S. patent application Ser. No. 11/485,775, filed Jul. 13, 2006, which is incorporated herein by reference.

FIELD OF THE INVENTION

The present invention relates generally to data storage, and specifically to data storage using pools of storage resources.

BACKGROUND OF THE INVENTION

As demands on data storage systems increase, the requirements to use the storage resources of the systems more efficiently also increase. Large storage systems typically include highly distributed storage resources and may include relatively large amounts of little used, or even unused, storage resources. Even though such little used or unused storage resources may be relatively cheap, as the data storage systems continue to be used there is a typically a natural decrease in the amount of such resources, and consequently an increase in management activity associated with the systems. Thus, there is a need to improve the efficiency of management activity of data storage systems.

SUMMARY OF THE INVENTION

In an embodiment of the present invention, a method for data storage is provided. The method includes configuring in a data storage system a volume storage pool as data storage resources available for allocation of volumes in the data storage system. A threshold value for the volume storage pool is defined, and when the allocation of the volumes causes the threshold value to be crossed, an action for managing the volume storage pool is performed.

In another embodiment of the present invention, an alternative method for data storage is provided. The alternative method includes configuring in a data storage system a volume storage pool as volume-data-storage-resources available for allocation of volumes in the data storage system, and defining a volume-threshold for the volume storage pool. In addition, a snapshot storage pool as snapshot-data-storage-resources available for allocation of snapshots in the data storage system is configured in the system, and a snapshot-threshold for the snapshot storage pool is defined. When the allocation of the snapshots causes the snapshot-threshold to be crossed, resources included in the volume-data-storage-resources are transferred to the snapshot-data-storage-resources.

In an alternative embodiment of the present invention, apparatus for data storage is provided. The apparatus includes data storage devices which are configured to provide a volume storage pool as data storage resources available for allocation of volumes in a data storage system. The apparatus also includes a management module configured to define a threshold value for the volume storage pool. The module is configured to perform an action for managing the volume storage pool when the allocation of the volumes causes the threshold value to be crossed.

In some embodiments of the present invention, alternative data storage apparatus is provided. The alternative apparatus includes data storage devices configured to provide a volume storage pool as volume-data-storage-resources available for allocation of volumes in a data storage system, and configured to provide a snapshot storage pool as snapshot-data-storage-resources available for allocation of snapshots in the data storage system. The alternative apparatus also includes a management module configured to define a volume-threshold for the volume storage pool and to define a snapshot-threshold for the snapshot storage pool. When the allocation of the snapshots causes the snapshot-threshold to be crossed, the module is configured to transfer resources from the volume-data-storage-resources to the snapshot-data-storage-resources.

There is further provided, according to a further embodiment of the present invention, a computer software product for operating a storage system, the product including a computer-readable medium having program instructions recorded therein, which instructions, when read by a computer, cause the computer to configure in a data storage system a volume storage pool as data storage resources available for allocation of volumes in the data storage system, define a threshold value for the volume storage pool, and, when the allocation of the volumes causes the threshold value to be crossed, perform an action for managing the volume storage pool.

The present invention will be more fully understood from the following detailed description of the embodiments thereof, taken together with the drawings, in which:

DETAILED DESCRIPTION OF EMBODIMENTS

Throughout the specification and the claims the term "storage unit" is used to describe a unit of storage space within a data storage system for which a snapshot storage pool may be defined. A storage unit may correspond to one or a group of physical storage devices, such as a disk, or a storage unit may correspond to a virtual unit of storage space defined and operated over physical data storage devices. Each virtual storage unit may be defined over one or more than one physical data storage devices, and may be defined over whole storage devices or over portions of storage devices and any combination thereof. It would be appreciated that a storage unit as used herein may include, but is not limited to: one or a group of two or more logical units (LU) (for example, in a storage area network (SAN) system), one or a group of two or more files of a file system (for example, in a network-attached storage (NAS) system), etc.

In the specification and in the claims, a snapshot is assumed to comprise a virtual copy of a storage unit as it existed at the time of establishing the snapshot. A snapshot storage pool is assumed to comprise a shared pool of storage resources which are allocated for storing data associated with snapshots. A volume is assumed to comprise one or more logical units. A volume storage pool is assumed to comprise a shared pool of storage resources which are allocated for storing data associated with volumes. In each case, i.e., a snapshot storage pool or a volume storage pool, the allocated storage resources typically comprise groups of logical addresses associated with physical data storage devices.

Figure 1:
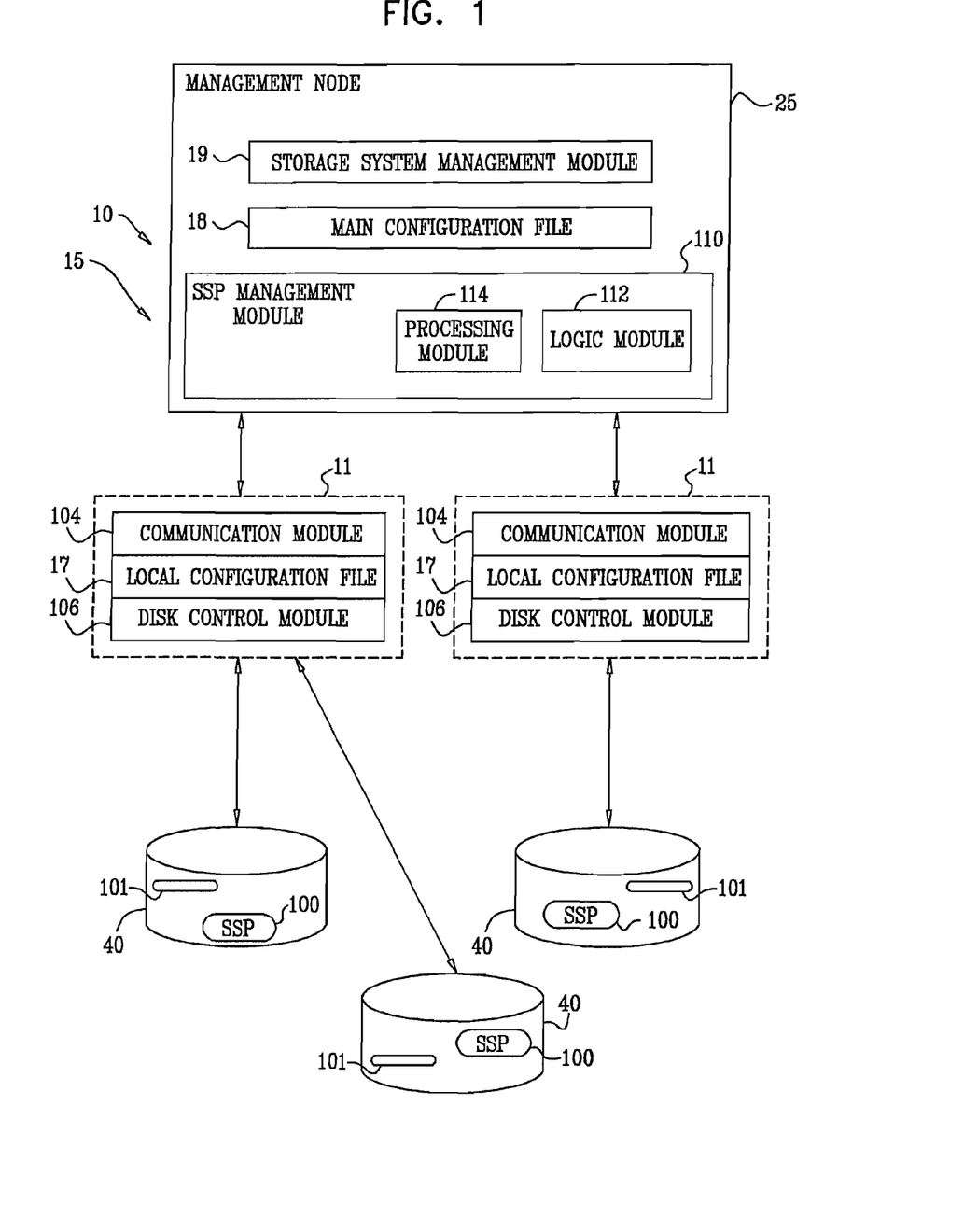
FIG. 1 is a block diagram illustration of an apparatus for managing a snapshot storage pool (SSP) and associated elements of a distributed storage system, according to an embodiment of the present invention.

Turning now to FIG. 1, there is shown a block diagram illustration of an apparatus 15 for managing a snapshot storage pool (SSP) and associated elements of a distributed storage system, according to some embodiments of the invention. In FIG. 1 and according to some embodiments of the invention, an SSP management module 110 is implemented as part of a management node 25 of a distributed storage system 10. According to further embodiments of the invention, the SSP management module 110 is in communication with permanent storage devices 40. According to some embodiments of the invention, the SSP management module 110 is operatively connected to the permanent storage devices 40 through one or more disk controllers 106. In FIG. 1 and according to some embodiments of the invention, the SSP 100 is distributed over the permanent storage devices 40. Further details with respect to the portion of the distributed storage system 10 shown in FIG. 1 shall be provided below.

According to some embodiments of the invention, the SSP management module 110 is adapted to manage the SSP 100. According to some embodiments of the invention, the SSP management module 110 may include a logic module 112 and a processing module 114. According to some embodiments of the invention, the logic module 112 may be adapted to provide a threshold corresponding to a ratio between a current amount of storage resources used for storing snapshots in the SSP 100 and a total storage capacity defined for the SSP 100, and the processing module 114 may be adapted to trigger an action which is effective for managing the SSP 100 in response to the amount of storage resources used for storing snapshots in the pool 100 crossing the threshold. Alternatively, the threshold may be defined in terms of a function of the current amount of storage resources and/or the total storage capacity of SSP 100, such as a difference between the two quantities, and may not comprise a ratio. In the following description, a threshold associated with a snapshot storage pool such as SSP 100 is also referred to as a snapshot-threshold. According to some embodiments of the invention, the processing module 114 may be adapted to trigger a predefined action in connection with a certain snapshot-threshold. According to further embodiments of the invention, the processing module 114 may be adapted to trigger a plurality of predefined actions and each of the predefined actions may be associated with a different snapshot-threshold, as will be described in further detail below.

In accordance with some embodiments of the present invention, the snapshot-threshold corresponding to a ratio between a current amount of storage resources used for storing snapshots in the SSP 100 and a total storage capacity defined for the SSP 100 may be representative of a situation of near-depletion of the storage resources allocated for the SSP 100. Thus, for example, according to some embodiments of the invention, the action (which is effective for managing the SSP 100) may be triggered when the storage resources associated with the SSP 100 are nearing depletion. An example of a process according to some embodiments of the invention whereby resources of the portion of the storage system 10 shown in FIG. 1 are utilized in a manner to enable the SSP management module 110 to implement the snapshot-threshold with respect to the ratio between a current amount of storage resources used for storing snapshots in the SSP 100 and a total storage capacity defined for the SSP 100 and further in a manner to trigger an action which is effective for managing the SSP 100 in response to the amount of storage resources used for storing snapshots in the pool 100 crossing the snapshot-threshold.

According to some embodiments of the invention, the predefined action may include a deletion of data corresponding to an existing snapshot or snapshots from the SSP 100. According to some embodiments of the invention, by deleting data corresponding to existing snapshots from the SSP 100, the amount of storage resources used for storing snapshots in the SSP 100 may be reduced. It would be appreciated that according to some embodiments of the invention, the deletion of data corresponding to existing snapshots from the SSP 100 may enable continued snapshots establishment and generation, where otherwise, additional snapshots would not have been allowed, for example, due to exhaustion of storage resources defined for the SSP 100. However, further embodiments of the present invention may not be limited to any particular motivation.

According to further embodiments of the invention, the logic module 112 may include a criterion\a to be used by the processing module 114 for determining which data to delete when the threshold is crossed. The criterion\a may relate to the amount of data to be deleted and may also relate to characteristics of the data to be deleted and/or to characteristics of the snapshot(s) whose corresponding data is to be deleted. Thus, based upon the criterion\a the processing module 114 may determine which data to delete once the action is triggered. Examples of criteria for determining which data to delete may include, but are not limited to, data corresponding to a predefined number of least-recently established snapshot(s), data corresponding to a predefined number of most-recently established snapshot(s), data corresponding to a predetermined number of snapshots which are associated with the greatest amount of used storage resources (and subsequently, whose storage requires the greatest amount of storage resources), data corresponding to a predetermined number of snapshots which are associated with the least amount of used storage resources, data corresponding to a predefined number of snapshots that are associated with data that is being most frequently addressed with input/output (I/O) requests, data corresponding to a predefined number of snapshots that are associated with data that is being least frequently addressed with I/O requests, etc. It would be appreciated that, according to some embodiments of the invention, intelligent threshold selection may contribute to a significant reduction in the likelihood of the storage resources defined for the SSP 100 becoming depleted. It would be further appreciated that, according to some embodiments of the invention, an intelligent data deletion strategy for managing the deletion data corresponding to snapshots from the SSP 100 (as may be embodied in the criterion\a used for determining which snapshot-associated data to delete) may reduce the likelihood of more important data being lost.

The criteria may also include priorities for deletion of snapshots. The priorities are typically set by an operator of one of hosts 52. Thus, when an operator generates a snapshot, the operator may assign a delete-snapshot priority number to the snapshot. The number is made available to logic module 112, and the logic module prioritizes which deletion actions to perform, i.e., which snapshots to delete, according to the assigned delete-snapshot priority number. The delete-snapshot priority number may also include a value indicating that the snapshot to which the number is assigned is not to be deleted.

In some embodiments, at generation of a current snapshot, the operator is presented with a list of snapshots, showing relevant parameters of the snapshots such as the times of the snapshots that have previously been generated, and delete-snapshot priority numbers, or the equivalent priorities, that have already been assigned. The operator may assign a delete-snapshot priority number to the current snapshot based on the previously generated snapshots and their parameters. Alternatively or additionally, the operator may change the priority of a previously generated snapshot by changing its number. The change may be effected at the time of generation of a current snapshot, or at some other time convenient for the operator.

According to further embodiments of the invention, the predefined action may include a reallocation of additional storage resources from a reserve storage pool 101 of the data storage system 10 to the SSP 100. By allocating additional storage resources to the SSP 100, the total amount of storage resources defined for the SSP 100 is increased. The reserve storage pool 101 may include, for example, storage resources allocated to a failure recovery storage pool. A failure recovery storage pool may be, for example, a pool of storage resources allocated and reserved by a storage system for use in case of a failure of a storage element (e.g. a disk), as part of a recovery process. According to some embodiments of the present invention, the logic module 112 may include a criterion\a to be used by the processing module 114 for determining the amount of storage resources to be allocated for the SSP 100, once the processing module 114 determines that additional storage resources need to be allocated to the SSP 100 from the reserve storage pool 101. Alternatively, the logic module 112 may include data with respect to a fixed amount of storage resources to be allocated whenever the threshold is crossed, and the processing module 114 may be configured to allocate the additional fixed amount of storage resources whenever the corresponding action is triggered.

According to still further embodiments of the invention, the predefined action may include transferring storage resources previously associated with a second SSP (not shown in FIG. 1) to the SSP 100. A distributed data storage system in which more than one SSP is provided, shall be discussed in greater detail below with reference to FIG. 2. The logic module 112 may include a criterion\a to be used by the processing module 114 for determining from which SSP to take the additional storage resources. For example, in accordance with a criterion provided by the logic module 112, once the action is triggered, the processing module 114 may be configured to cause certain storage resources to be disassociated from a second SSP.

According to some embodiments of the invention, the SSP from which the storage resources are to be taken may be selected in accordance with one or more of the following criteria: the SSP associated the largest amount of unused storage resources; the SSP associated with the smallest amount of unused storage resources; the SSP associated with the least-recently established snapshots; the SSP associated with the most-recently established snapshot(s). According to some embodiments of the invention, the storage resources from the second SSP (the transferring SSP) may be re-associated with and made available to the (receiving) SSP 100.

According to further embodiments of the invention, other criterion\a may also be used in addition to the above criterion or as an alternative.

According to some embodiments of the invention, the logic module 112 may also include criterion\a to be used by the processing module 114 for determining what amount of storage resources to transfer. For example, in accordance with a criterion provided by the logic module 112, once the action is triggered, the processing module 114 may be configured to cause a predefined amount of storage resources to be transferred from a second SSP to the SSP 100. In accordance with another example, the amount of storage resources to be transferred may be determined in accordance with the amount of unused storage resources associated with the other SSP, for example, in accordance with the amount of unused storage resources in the SSP from which storage resources are to be taken as determined in accordance with a predefined criterion. It should be appreciated that in accordance with some embodiments of the invention, the processing module 114 may be adapted to take the storage resources to be transferred to the SSP 100 from several (other) SSPs. The processing module 114 may be adapted to determine from which SSPs to take the storage resources, for example, in accordance with any one or more of the above mentioned criteria, with the necessary modification to accommodate for the selection of a plurality of SSPs. The processing module 114 may be configured to take a certain fixed amount of storage resources from each of the SSPs, or in accordance with further embodiments of the invention, the processing module may take a different amount of storage resources from each of the SSPs, for example, based on the amount of storage resources used by the SSP.

The logic module 112 may be configured to provide a single threshold or it may be configured to provide more than one threshold. According to some embodiments of the invention, in case more than one threshold is provided by the logic module 112, each threshold may be associated with a different action, for example, each threshold may be associated with a different one of the actions discussed above. According to further embodiments of the invention, in case more than one threshold is provided by the logic module 112, two or more thresholds may be associated with different action parameters with respect to the same action (for example, one of the actions discussed above). Thus, for example, in accordance with some embodiments of the invention, the logic module 112 may provide a first threshold associated with a relatively low amount of used storage resources relative to the total storage capacity defined for the SSP 100 (low ratio), and a second threshold associated with a high amount of used storage resources relative to the total storage capacity defined for the SSP 100 (high ratio). For the low ratio threshold the logic module 112 may provide action parameters which are effective to cause the processing module 114 to delete from the SSP 100 data corresponding to a relatively small number of snapshots when the low ratio threshold is crossed, for example, one snapshot, whereas for the high ratio threshold the logic module 112 may provide action parameters which are effective to cause the processing module 114 to delete data corresponding to a relatively large number of snapshots when the high ratio threshold is crossed, for example, three snapshots.

According to some embodiments of the invention, the processing module 114 may be adapted to determine the ratio between the current amount of storage resources used for storing snapshots in the SSP 100 and the total storage capacity defined for the SSP 100, as part of determining whether the ratio crossed a threshold and an associated action should be triggered, in response to receiving an indication that a snapshot is about to be established. However, according to further embodiments of the invention, the calculation of the ratio and the decision whether or not to trigger an action with respect to the SSP 100 may be responsive to any other events in the data storage system 10. According to yet further embodiments of the invention, the processing module 114 may be configured to periodically perform the calculation of the ratio and subsequently to decide whether to trigger an action or not. For example, the processing module 114 may be configured to check the ratio between current amount of storage resources used for storing snapshots in the SSP 100 and the total storage capacity defined for the SSP 100 at predefined times or after predefined intervals. According to some embodiments of the invention, the time instances at which the processing module 114 is configured to check the ratio may be adjusted from time to time, for example, based upon changes in system performance parameters or based upon any other relevant parameters.

As mentioned above, in FIG. 1, and according to some embodiments of the invention, the SSP management module 110 may be implemented as part of a management node 25 of the distributed data storage system 10. The management node 25 may be adapted to manage the storage resources of the distributed data storage system 10. According to some embodiments of the invention, the management node 25 may be adapted to define storage units which are to be used for storing data in the distributed data storage system 10. As part of defining the storage units, the management node 25 may be configured to determine the relationship between the storage units and the data storage devices 40 of the data storage system 10. According to further embodiments of the invention, the management node 25 may be adapted to define virtual data storage units over the physical data storage devices 40.

According to some embodiments of the invention, the management node 25 may include a storage system management module 19 and a main configuration file 18. The storage system management module 19 may be adapted to provide a configuration of the data storage system 10. Specifically, the storage system management module 19 may be adapted to define storage units within the data storage system 10 and to manage the storage units. The data with respect to the configuration of the data storage system 10 may be kept on the main configuration file 18 stored on or otherwise associated with the management node 25. The storage system management module 19 may be adapted to define data storage units over the physical data storage devices 40. According to some embodiments of the invention, a storage unit may be defined over one or more than one physical data storage devices 40. According to further embodiments of the invention, a storage unit may be defined over whole storage devices 40 or over portions of storage devices 40 and any combination thereof. The storage system management module 19 may include the necessary logic to enable it to determine the relationship between the storage units and the data storage devices 40 of the data storage system 10 and to manage this relationship. The data with respect to the relationship between the storage devices 40 and the storage units may be kept on the main configuration file 18. It would be appreciated that a storage unit as used herein may include, but is not limited to, a logical unit (LU) (for example, in a storage area network (SAN) system), a file of a file system (for example, in a network-attached storage (NAS) system), and other known in the present or yet to be devised in the future storage unit compatible with the teachings of the present invention.

The storage system management module 19 may be adapted to modify the relationship between the storage units and the data storage devices 40 of the data storage system 10. According to some embodiments of the invention the storage system management module 19 may be adapted to modify the relationship between the storage units and the data storage devices 40 of the data storage system 10 based upon predefined management rules, such as for example, in response to a request from the SSP management module 110 and in accordance with such a request, as is further discussed herein. As part of any modification, the storage system management module 19 may be adapted to update the data in the configuration file 18 in accordance with the modified configuration.

As mentioned above, in FIG. 1 and according to some embodiments of the invention, the SSP 100 may be distributed over the permanent storage devices 40. According to some embodiments of the invention, the storage system management module 19, either alone or in cooperation with the SSP management module 110, may provide storage resources on the storage devices 40 on which data corresponding to snapshots associated with the SSP 100 may be stored. According to some embodiments of the invention, the storage system management module 19 may allocate, for example, in cooperation with the storage system management module 19, storage resources on the data storage devices 40 for the SSP 100. According to further embodiments of the invention, the storage resources allocated for the SSP 100 may be registered in the main configuration file 18. Thus, changes made with respect to the storage resource allocated for the SSP 100 may be reflected in the main configuration file 18 and the main configuration file 18 may be modified accordingly.

A SSP 100 may be defined on a single data storage device 40 or across a plurality (two or more) of storage devices 40, and the SSP 100 may be associated with several areas on or portions of a storage device or storage devices 40. According to some embodiments of the invention, a SSP 100 may be defined for a (virtual) storage unit or for a group of storage units (two or more) in the system 10. The storage resource allocated for and associated with each SSP 100 may be registered, for example, in the main configuration file 18. In case the SSP 100 is distributed over a plurality of data storage devices 40 the main configuration file 18 may include data with respect to the storage resources on each of the data storage devices 40 which have been allocated for the SSP 100. According to some embodiments of the invention, whenever it is determined that certain changes are to be made with respect to the storage resources allocated for a SSP 100, the main configuration file 18 may be modified accordingly. According to further embodiments of the invention, changes with respect to the storage resources allocated for a SSP 100 are implemented by modifying the main configuration file 18 in accordance with the desired changes.

As mentioned above, according to some embodiments of the invention, the SSP management module 110 may be adapted to provide a threshold corresponding to a ratio between a current amount of storage resources used for storing snapshots in the SSP 100 and a total storage capacity defined for the SSP 100, and may be adapted to trigger an action which is effective for managing the SSP 100 in response to the amount of storage resources used for storing snapshots in the pool 100 crossing the threshold. According to some embodiments of the invention, a single SSP 100 may be defined in the storage system 10 or a plurality of SSPs 100 may be defined within a single storage system 10, for example, within a distributed storage system. According to further embodiments of the invention, the SSP management module 110 may be adapted to provide a threshold for each of a plurality of SSPs 100 defined in the system 10, and with respect to each SSP 100 may be adapted to trigger an action which is effective for managing the SSP 100 in response to the amount of storage resources used for storing snapshots in the pool 100 crossing the threshold provided for the SSP 100. According to yet further embodiments of the invention, the threshold implemented by the SSP management module 110 with respect to a SSP may be sensitive to parameters associated with a second SSP (and possibly with further SSPs). For example, a threshold implemented by the SSP management module 110 with respect to a first SSP may be sensitive to the ratio between the current amount of storage resources used for storing data in a second SSP and the total amount of storage resources allocated for the second SSP. A distributed data storage system in which a plurality of SSPs are defined is shown in and described below with reference to FIG. 2.

According to some embodiments of the invention, the SSP management module 110 may be adapted to obtain data with respect to the current amount of storage resources used for storing snapshots in a SSP 100. According to further embodiments of the invention, the data with respect to the current amount of storage resources used for storing snapshots in the SSP 100 may be obtained from any available source, or according to still further embodiments of the invention, the data with respect to the current amount of storage resources used for storing snapshots in the SSP 100 may be generated by the SSP management module 110 for each of the SSPs it is responsible for managing. For example, according to some embodiments of the invention, the SSP management module 110 may be adapted to record data with respect to data write operations in connection with a SSP 100. A data write operation may include, for example, any writing of data into a data storage device 40 or into a portion of a data storage device 40 which belongs to a storage unit with which the SSP 100 is associated. The SSP management module 110 may include a storage medium (not shown) for enabling the SSP management module 110 to record data with respect to data write operations in connection with the SSP 100. However, the SSP management module 110 may store the data elsewhere. In case the SSP management module 110 is used to manage a plurality of SSPs, the SSP management module 110 may be adapted to record each data write operation in connection with each SSP 100 separately or with reference to the SSP 100 with which the write operation is associated. According to some embodiments of the invention, the SSP management module 110 may record for each data write operation in connection with a SSP 100 at least the amount of storage resources used for writing the data, and data with respect to where the data is stored.

Thus, according to some embodiments of the invention, based on the records with respect to the write operations in connection with a SSP 100, the SSP management module 110 may be adapted to determine the ratio between a current amount of storage resources used for storing snapshots in the SSP 100 and a total storage capacity defined for the SSP 100 and to compare the ratio against the predefined threshold. According to some embodiments of the invention, the SSP management module 110 may be configured to calculate the ratio with respect to a (certain) SSP 100 and to compare it against the threshold provided for that SSP 100 whenever data is written into the SSP 100. However, some embodiments of the invention are not limited in this respect, and the SSP management module 110 may be configured to calculate the ratio with respect to a (certain) SSP 100 and to compare it against the threshold provided for that SSP 100 in response to other events, for example, after a predefined number of write operations into the SSP 100, or the SSP management module 110 may be configured to calculate the ratio with respect to a (certain) SSP 100 and to compare it against the threshold provided for that SSP 100 periodically, for example, after predefined time intervals.

As mentioned above, according to some embodiments of the invention, the action may include a deletion of data corresponding to existing snapshots from the SSP 100. According to some embodiments of the invention, as part of deleting data corresponding to existing snapshots from the SSP 100, the SSP management module 110 may be adapted to obtain data with respect to the location, for example, on the data storage device(s) 40, of data corresponding to a snapshot which is to be deleted. According to some embodiments of the invention, the SSP management module 110 may be adapted to interface with the main configuration file 18 and/or with the local configuration files 17 associated with each disk control module 106 to enable the SSP management module 110 to perform the actions discussed herein with respect to the SSP 100 and/or to obtain any necessary data in connection therewith. Once the data with respect to the location of data corresponding to the snapshot is obtained, the SSP management module 110 may be configured to delete from the storage device(s) 40 the data corresponding to the snapshot. If necessary, the storage system management module 19 and the main configuration file 18 may be utilized by the SSP management module 110 to enable the identification of the data to be deleted and to further enable the deletion thereof.

According to further embodiments of the invention, the predefined action may include an allocation of additional storage resources from a reserve storage pool 101 of the data storage system to the SSP 100. According to some embodiments of the invention, the SSP management module 110 may be adapted to cause storage resources previously allocated to a reserve storage pool 101 to be reallocated to a receiving SSP 100. For example, the SSP management module 110 may be adapted to cause the reallocation of the storage resources to the receiving SSP 100 in cooperation with the storage system management module 19. According to further embodiments of the invention the SSP management module 110, for example in cooperation with the storage system management module 19 may be adapted to modify the data in the main configuration file 18 to reflect the reallocation of the storage resource previously associated with a reserve storage pool 101 to the receiving SSP 100.

According to still further embodiments of the invention, the predefined action may include transferring storage resources previously associated with a second snapshot storage pool (not shown in FIG. 1) to the snapshot storage pool 100. For example, according to some embodiments of the invention, the SSP management module 110 may be configured to modify, for example in cooperation with the storage system management module 19, the data in the main configuration file 18 such that storage resources previously associated with a second SSP are transferred to the SSP 100.

Those of ordinary skill in the art may appreciate that according to some embodiments of the invention, the SSP management module 110 may be adapted to take any further measures as may be necessary to perform any of the aforementioned actions.

According to some embodiments of the invention, the management node 25, and in particular, the SSP management module 110 may interact with the data storage devices 40 through a disk control module 106. The disk control module 106 may be adapted to manage various aspects of the operation of the data storage devices 40, including interfacing and managing the interaction of the management node 25 and the SSP management module 110 with the data storage devices 40. According to some embodiments of the invention, the disk control module 106 may be adapted to generate and relay read and write tasks to the data storage devices 40 with which it is associated. In FIG. 1, and according to some embodiments of the invention, the disk control module 106 may be implemented as part of a cache 11. However, further embodiments of the invention are not limited in this respect, and the disk control module 106 may be otherwise implemented in the storage system. The communication module 104 may be provided to enable communication between the disk control module 106 and other components of the data storage system, and to enable communication between the disk control module 106 and other devices exterior to the data storage system, for example, with hosts.

It would be appreciated that some embodiments of the invention are not limited to being implemented as part of a distributed storage system. Rather, some embodiments of the invention may be implemented as part of any presently known or yet to be devised in the future storage system. Those of ordinary skill in the art may readily devise further implementations of some embodiments of the invention, for example, as part of various other storage systems. Furthermore, it should be noted that according to some embodiments of the invention, the SSP management module is not limited to being implemented as part of a management node of storage system, nor is it limited to being implemented as part of any other element of a storage system. According to further embodiments of the invention, the SSP may not be limited to being associated with and utilizing a cache for interfacing with the SSP, and it may use other elements of the storage system or it may be adapted to interact directly with the storage device to perform the actions described herein.

Figure 2:
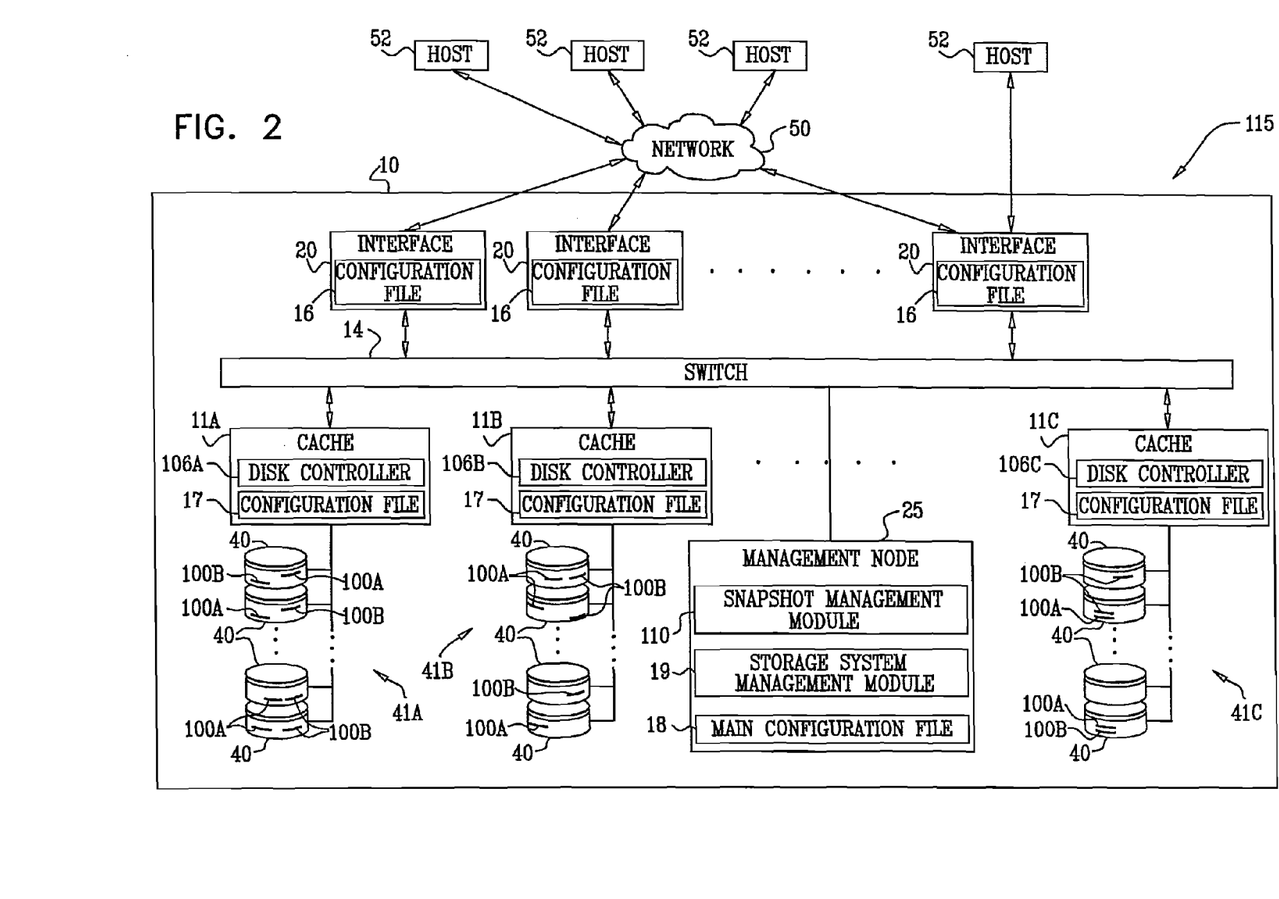
FIG. 2 is a block diagram illustration of one example of a distributed data storage system including an apparatus for managing an SSP, according to an embodiment of the present invention.

Reference is now made to FIG. 2, which is a block diagram illustration of one example of a distributed data storage system 115 including an apparatus for managing a snapshot storage pool, according to some embodiments of the invention. According to some embodiments of the invention, and as is shown in FIG. 2, an apparatus for managing a snapshot storage pool may be implemented as a SSP management module 110 and may be incorporated within a storage system management node 25. The storage system management node 25 may further include a storage system management module 19. The storage system management module 19 may be adapted to determine and provide the configuration of the data storage system 10. The management node 25 may be adapted to define, for example, storage units 41A, 41B and 41C in the distributed storage system 10 and may determine the relationship between the physical data storage devices 40 and the virtual storage units 41A-41C. The data with respect to the configuration of the distributed data storage system 10, and specifically, with respect to the relationship between the storage devices 40 and the virtual storage units 41A-41C, may be kept at a main configuration file 18. The main configuration file 18 may be stored on the management node 25.

According to some embodiments of the invention, the SSP management module 110 may be adapted to define for each storage unit or for each group of storage units a SSP 100A and 100B and may provide, for example, in cooperation with the storage system management module 19, storage resources on the physical data storage devices 40 for storing data associated with the SSP. According to some embodiments of the invention, each of the SSPs 100A and 100B may be associated with a certain storage unit, for example with a certain logical unit or in accordance with another example, with a certain volume, and/or each of the SSPs 100A and 100B may be associated with a certain group of storage units. It would be appreciated that groups of storage units may sometimes be referred to in the context of snapshots as a "consistency group".

In FIG. 2, and according to some embodiments of the invention, the SSPs 100A and 100B may be distributed over the physical data storage devices 40. According to some embodiments of the invention, the distribution of the SSPs 100A and 100B over the physical storage device 40, and the management thereof, may be performed in accordance with a storage system management algorithm implemented by the storage system management module 19 and/or in accordance with an SSP management algorithm implemented by the SSP management module 110, for example. In accordance with another embodiment of the invention, each storage unit may be associated with specific physical storage device(s) 40, and the SSPs defined for a certain storage unit(s) may be assigned with storage resources on the specific physical storage device(s) 40 associated with the specific storage unit(s). For example, for a group of storage units including storage units 41A and 41B a first SSP 110A may be defined, and for storage unit 41C a second SSP 100B is defined.

According to some embodiments of the invention, the storage resources allocated for the SSPs 100A and 100B may be registered, for example, within and as part of the main configuration file 18. Thus, changes made with respect to the storage resource allocated for the SSPs 100A and 100B may be reflected in the main configuration file 18 and the main configuration file 18 may be modified accordingly. However, according to further embodiments of the invention, data with respect to the storage resources allocated for the SSPs 100A and 100B may be registered elsewhere either in addition to being registered within the main configuration file 18 or as an alternative.

In FIG. 2 and according to some embodiments of the invention, the SSP management module 110 may be adapted to provide for each of the first and the second SSPs 100A and 100B a threshold corresponding to a ratio between a current amount of storage resources used for storing snapshots in each of the first and the second SSPs 100A and 100B and a total storage capacity defined for each of the first and the second SSPs 100A and 100B, and may be adapted to trigger an action which is effective for managing the first or the second SSPs 100A or 100B in response to the amount of storage resources used for storing snapshots in the first or the second SSP 100A or 100B crossing the respective threshold. According to some embodiments of the invention, the total storage capacity defined for a SSP 100A and 100B may be determined by the SSP management module 110, for example, in cooperation with the storage system management module 19. According to some embodiments of the invention, with respect to each SSP 100A and 100B, the SSP management module 110 may be adapted to trigger an action which is effective for managing the SSP 100A and 100B in response to the amount of storage resources used for storing snapshots in the SSP 100A and 100B crossing the threshold provided for the SSP 100A and 100B. According to yet further embodiments of the invention, the threshold implemented by the SSP management module 110 with respect, for example, to a first SSP 100A may be sensitive to parameters associated with a second SSP 100B, and vice-versa. For example, a threshold implemented by the SSP management module 110 with respect to the first SSP 100A may be sensitive to the ratio between the current amount of storage resources used for storing data in the second SSP 100B and the total amount of storage resources allocated for the second SSP 100B.

In FIG. 2, and according to some embodiments of the invention, the SSP management module 110 may be adapted to record each data write operation in connection with each of the first and the second SSPs 100A and 100B separately or with reference to the SSP 100A and 100B with which the write operation is associated. According to some embodiments of the invention, the SSP management module 110 may record for each data write operation in connection with a SSP 100A and 100B at least the amount of storage resources used for writing the data, and data with respect to the location where the data is stored.

Various aspects of the invention which are applicable to the management of SSPs 100A and 100B have been discussed above. Provided below is an example of a scenario which illustrates certain aspects of the operation of some embodiments of the SSP management module 110. According to some embodiments of the invention, the SSP management module 110 may be adapted to transfer storage resources from the second SSP 100B to the first SSP 100A when it is determined that the ratio between the current amount of storage resources used for storing snapshots in the first SSP 100A and a total storage capacity defined for the first SSP 100A crosses a predefined threshold which is associated with such an action. According to further embodiments of the invention, the transfer of storage resources from the second SSP 100B to the first SSP 100A and/or the extent of the storage resources to be transferred may depend upon the ratio between the current amount of storage resources used for storing snapshots in the second SSP 100B and a total storage capacity defined for the second SSP 100B. According to yet further embodiments of the invention, as part of transferring storage resources from the second SSP 100B to the first SSP 100A, the SSP management module 110 in cooperation with the storage system management module 19 may cause the storage resources which are to be transferred to also be transferred from the storage unit(s), with which the second SSP 100B is associated, to storage unit(s) with which the receiving SSP, in this case the first SSP 100A, is associated.

In FIG. 2, and according to some embodiments of the invention, the distributed data storage system 10 may further include one or more interfaces 20, a switch 12, a plurality of disk controllers 106A-106C, here being part of cache devices 11A, 11B and 11C, and a plurality physical storage devices or permanent storage devices 40. Disk controllers 106A-106C are each substantially similar to disk control module 106, and cache devices 11A, 11B and 11C are each substantially similar to cache 11. The interface(s) 20 may be adapted to send and receive data to and from one or more hosts 52 associated with the distributed data storage system 10. The interface(s) 20 may enable the sending and receiving of data to and from the hosts 52 over a network 50, such as, but not limited to, the Internet. Each interface may include a copy of the configuration file 16 or some subset thereof. The switch 12 may be adapted to switch data from each of the interfaces 20 to each of the cache devices 11A-11C, and from each cache devices 11A-11C to each of the interfaces 20, as appropriate. The cache devices 11A-11C may be adapted to provide caching services and to utilize a disk controller 106A-106C to provide various management services in respect of the physical storage resources 40. The storage units 40A-40C may be implemented over a plurality of physical storage devices 40, such as optical and/or magnetic disks, on which data may be substantially permanently stored in the distributed data storage system 10. According to some embodiments of the invention, each of the cache devices 11A-11C may include a local configuration file 17. The local configuration file 17 at each cache 11A-11C may include only a portion of the data in the main configuration file 18, for example, the portion of data in the main configuration file 18 which relates to the resources of the storage system 10 with which the cache 11A-11C in which the configuration file 17 is implemented is associated. However, further embodiments of the invention are not limited in this respect, and accordance to further embodiments of the invention, the local configuration files 17 may include additional data, for example, the entire configuration data included in the main configuration file 18, including data with respect to system 10 resources which are not directly associated with the cache device 11A-11C on which the configuration file 17 is stored.

It would be appreciated by those of ordinary skill in the art, that some embodiments of the invention may provide various advantages, such as by being substantially unrestrictive and dynamic in terms of the amount of snapshots that can be maintained at any given time for any group of storage units (such as LUs or volumes) in the system, by allowing a dynamic designation and definition of storage units for which snapshots are to be created and stored, including the ability to create snapshot copies for snapshot storage pools. Additionally, some embodiments of the invention are advantageous in that they enable to create snapshot storage pools whose management metadata is not directly proportional in size to the intended size of the snapshot storage pool.

Figure 3:
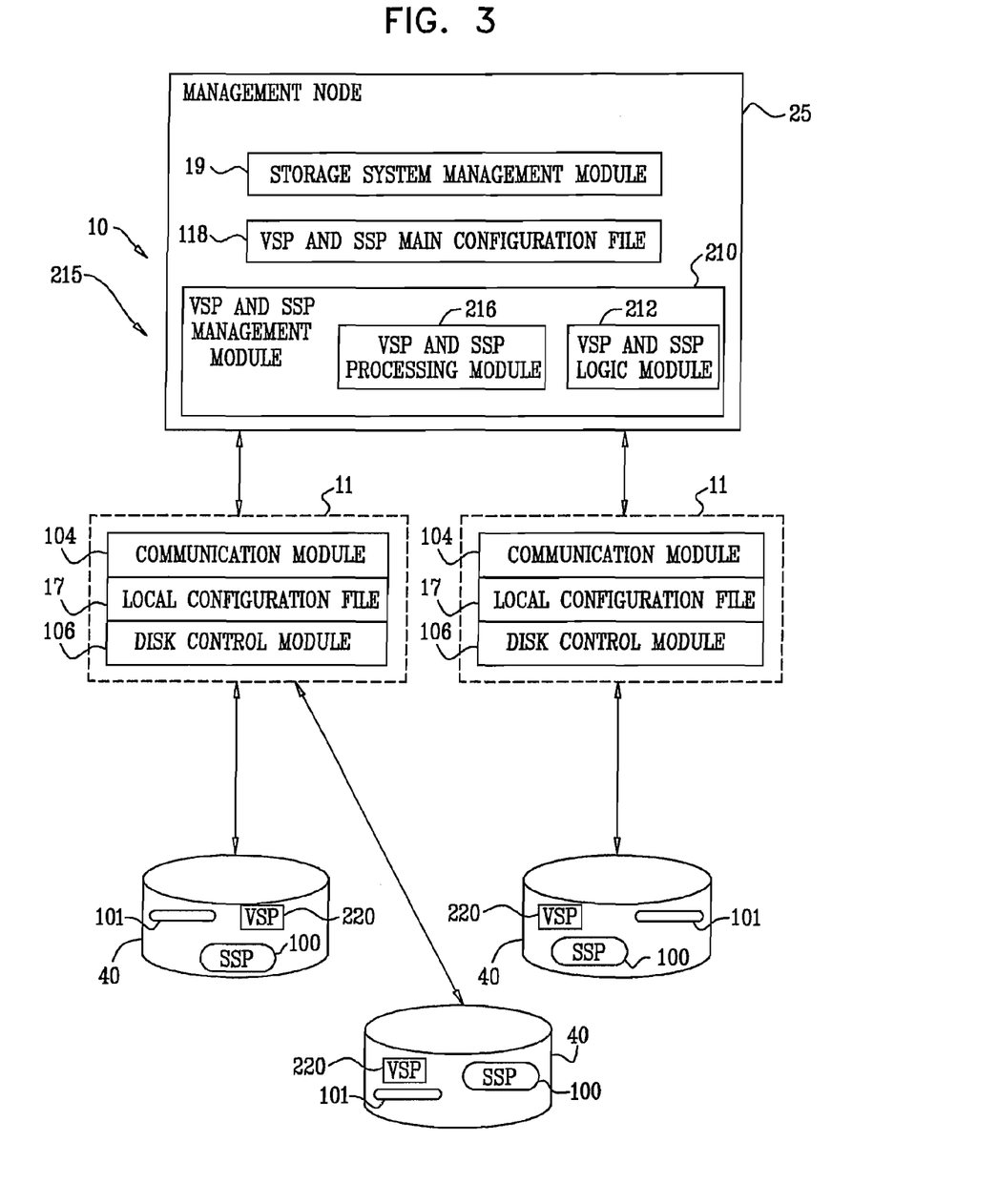
FIG. 3 is a block diagram of an apparatus for managing an SSP, a volume storage pool (VSP), and associated elements in a distributed storage system, according to an embodiment of the present invention.

FIG. 3 is a block diagram of an apparatus 215 for managing an SSP, a volume storage pool (VSP), and associated elements in a distributed storage system, according to an embodiment of the present invention. Apart from the differences described below, the operation of apparatus 215 is generally similar to that of apparatus 15 (FIG. 1), and elements indicated by the same reference numerals in both apparatus 15 and 215 are generally similar in construction and in operation.

Apparatus 215 comprises a VSP 220, which is a shared pool of storage resources allocated for storing data associated with volumes. VSP 220 is a shared pool having generally similar properties to those of SSP 100, except that the storage resources of VSP 220 are allocated for storing data associated with volumes. As for SSP 100, VSP 220 is typically distributed over more than one permanent storage device 40.

In embodiments of the present invention wherein reserve storage pool 101 is present, the reserve storage pool is configured to be able to provide additional storage resources to VSP 220. This is in addition to its functions described above with reference to FIG. 1, i.e., to be able to provide additional storage resources to SSP 100.

In apparatus 215, main configuration file 18, management module 110, processing module 114, and logic module 112 are respectively replaced by VSP and SSP main configuration file 118, VSP and SSP management module 210, VSP and SSP processing module 216, and VSP and SSP logic module 212. The replacement entities have generally the same properties regarding SSPs as the entities they replace, and as described above with reference to FIG. 1. The replacement entities also have additional properties regarding VSPs described below.

Logic module 212 provides a total storage capacity of storage resources used for VSP 220, and also provides one or more threshold values of the storage resources. The threshold values associated with VSP 220 are also herein termed volume-thresholds. In some embodiments a volume-threshold is defined in terms of a ratio between a current amount of storage resources used for volumes and the total storage capacity of storage resources used for VSP 220. Alternatively, the volume-threshold may be defined in terms of a function of the current amount of storage resources and/or the total storage capacity of VSP 220, such as a difference between the two quantities, and may not comprise a ratio. As for the snapshot-thresholds described above with reference to SSP 100, crossing of the volume-thresholds associated with VSP 220 is used as an indication of near-depletion of storage resources allocated for volumes, and the crossing acts as a trigger for a predefined action for managing VSP 220.

There may be more than one such volume-threshold. For example, a first volume-threshold may be a low ratio associated with a relatively low amount of used storage resources relative to the total storage capacity defined for VSP 220, and a second volume-threshold may be a high ratio associated with a high amount of used storage resources relative to the total storage capacity defined for VSP 220.

Figure 4:
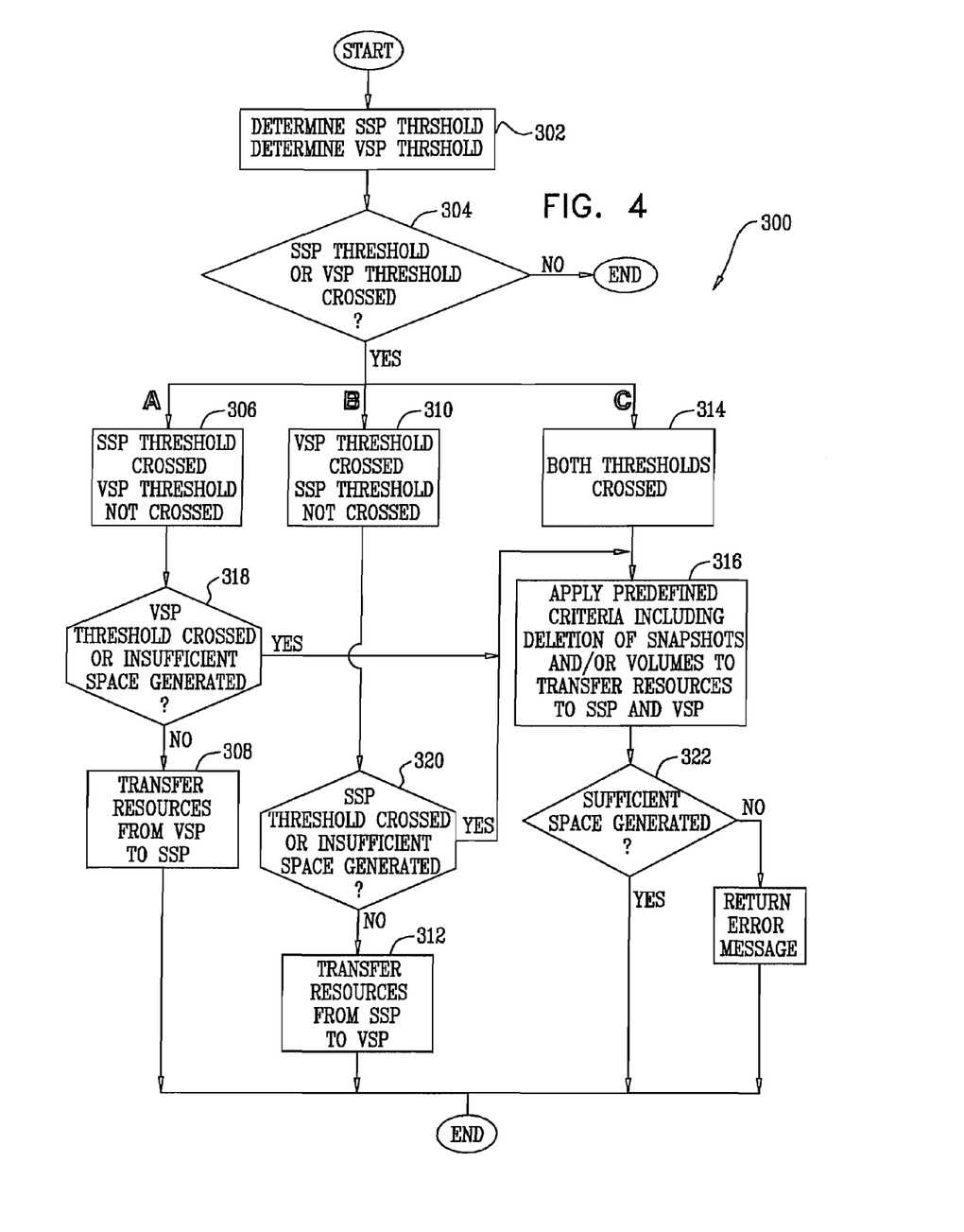
FIG. 4 is a flowchart showing steps of a process taken to reallocate storage resources between an SSP and a VSP, according to an embodiment of the present invention.

When a volume-threshold is crossed one or more of a number of predefined actions may be taken. The predefined actions include, but are not limited to:

deletion of data corresponding to storage resources of one or more volumes, reallocation of storage resources from reserve storage pool 101, reallocation of resources from a VSP different from VSP 220 (not shown in FIG. 3). An example of a system having two VSPs is described with reference to FIG. 5, reallocation of storage resources from SSP 100. FIG. 4 below describes a process of resource reallocation that includes reallocation from SSP 100 to VSP 220.

Each of the listed predefined actions is described in more detail below:

Logic module 212 and/or processing module 216 may delete data according to one or more of the following criteria:

data corresponding to a predefined number of least-recently established volumes;

data corresponding to a predefined number of most-recently established volumes;

data corresponding to a predetermined number of volumes which are associated with the greatest amount of used storage resources;

data corresponding to a predetermined number of volumes which are associated with the least amount of used storage resources;

data corresponding to a predefined number of volumes that are associated with data that is being most frequently addressed with I/O requests;

data corresponding to a predefined number of volumes that are associated with data that is being least frequently addressed with I/O requests.

The criteria may also include priorities for deletion of volumes. The priorities are typically set by an operator of one of hosts 52 and have generally similar properties to the priorities described above for snapshots. Thus, when an operator generates a volume, the operator may assign a delete-volume priority number to the volume. The delete-volume priority number is made available to logic module 212, and the logic module prioritizes which deletion actions to perform, i.e., which volumes to delete, according to the assigned delete-volume priority number. The delete-volume priority number may also include a value indicating that the volume to which the number is assigned is not to be deleted.

In some embodiments, at generation of a current volume, the operator is presented with a list of volumes, showing relevant parameters of the volumes such as the times of creation of volumes that have previously been generated, sizes of the volumes, and delete-volume priority numbers, or the equivalent priorities, that have already been assigned. The operator may assign the delete-volume priority number to the volume being generated based on the previously generated volumes and their parameters. Alternatively or additionally, the operator may change the priority of a previously generated volume. The change may be effected at the time of generation of a current volume, or at some other time convenient for the operator.

The operator may also set other criteria which correlate the priorities for deletion of both snapshots and volumes. For example, the operator may set a correlation-criterion that after deletion of a preset number of snapshots, a volume may be deleted. Alternatively or additionally, the correlation-criterion may comprise other parameters of snapshots and volumes, such as a time period during which the snapshots and volumes have been created. For a set of snapshots and volumes created during this period, snapshots may first be deleted according to their delete-snapshot priority number, and then volumes may be deleted according to their delete-volume priority number.

Logic module 212 and/or processing module 216 may reallocate storage resources from reserve storage pool 101 substantially as described above for the reallocation of resources from pool 101 for SSP 100.

Logic module 212 and/or processing module 216 may select another VSP from which to reallocate storage resources to VSP 220 according to one or more of the following criteria:

a VSP associated the largest amount of unused storage resources;

a VSP associated with the smallest amount of unused storage resources;

a VSP associated with the least-recently established volume or volumes;

a VSP associated with the most-recently established volume or volumes.

Logic module 212 and/or processing module 216 may reallocate storage resources between VSP 220 and SSP 100, as explained in the flowchart of FIG. 4 below.

FIG. 4 is a flowchart 300 showing steps of a process taken to reallocate storage resources between SSP 100 and VSP 220, according to an embodiment of the present invention. The steps in the flowchart are assumed to be followed by processing module 216 after the criteria and actions described above have been set. Typically, module 216 performs the process at preset time intervals. Alternatively or additionally, and as assumed in the following description, the module may perform the process prior to generation and/or population of a volume, writing of data to a volume, erasure of data from a volume, and/or generation of a snapshot.

In an initial step 302 module 216 determines a snapshot-threshold of SSP 100 and a volume-threshold of VSP 220 to be checked. If more than one snapshot-threshold or volume-threshold has been defined, module 216 repeats the steps of the flowchart for each different set of threshold values.

In a decision step 304, module 216 checks if either of the two thresholds have been crossed. If neither has, then the flowchart ends.

If either or both of the thresholds have been crossed, then the flowchart follows one of paths A, B, or C.

Path A is followed if in a step 306 the SSP snapshot threshold has been crossed, but the VSP volume-threshold value has not been crossed. In a decision step 318, module 216 checks if an intended transfer of resources from VSP 220 to SSP 100 causes the VSP volume-threshold to be crossed, or if the intended transfer generates insufficient space in SSP 100. If neither of these cases are true, then in a step 308, module 216 transfers storage resources from VSP 220 to SSP 100. If the intended transfer either does not generate sufficient space, or causes the VSP volume-threshold to be crossed, then the flowchart transfers to path C.

Path B is followed if in a step 310 the VSP volume-threshold has been crossed, but the SSP snapshot-threshold value has not been crossed. In a decision step 320, module 216 checks if an intended transfer of resources from SSP 100 to VSP 220 causes the SSP snapshot-threshold to be crossed, or if the intended transfer generates insufficient space in VSP 220. If neither of these cases hold, then in a step 312, module 216 transfers storage resources from SSP 100 to VSP 220. If the outcome of step 320 is true, then the flowchart transfers to path C.

Path C is followed if in a step 314 both thresholds have been crossed. In this case, in a step 316, module 216 increases resources in both SSP 100 and VSP 220 by applying one or more of the actions stated above. For example, module 216 may delete data corresponding to snapshots and/or volumes, or transfer storage resources associated with reserve storage pool 101. The deletion of snapshots and/or volumes is typically according to the criteria given above, and if priorities have been assigned, module 216 applies the priorities. Typically, at least some snapshots are initially deleted, and then one or more volumes are deleted.

In a decision step 322, module 216 checks that sufficient space has been made available for the current operation, i.e., by the application of steps 308, 312, and/or 316 as described above. If sufficient space has not been created, module 216 returns an error message indicating that there is no more available space.

The resource transfers and increases in steps 308, 312, and 316 may be performed incrementally, with module 216 checking after each increment if there has been sufficient resource transfer or increase so that the threshold or thresholds are no longer crossed.

Consideration of flowchart 300 shows that if volumes have not yet been populated, then the storage resources devoted to them in VSP 220 may be used for storage of snapshots. Similarly, if snapshots have not yet been generated, then the storage resources devoted to snapshots in SSP 100 may be used for storage of volumes. By performing the process of flowchart 300 repeatedly, as described above, the process of transfer of resources between volume storage pools and snapshot storage pools becomes dynamic.

Figure 5:
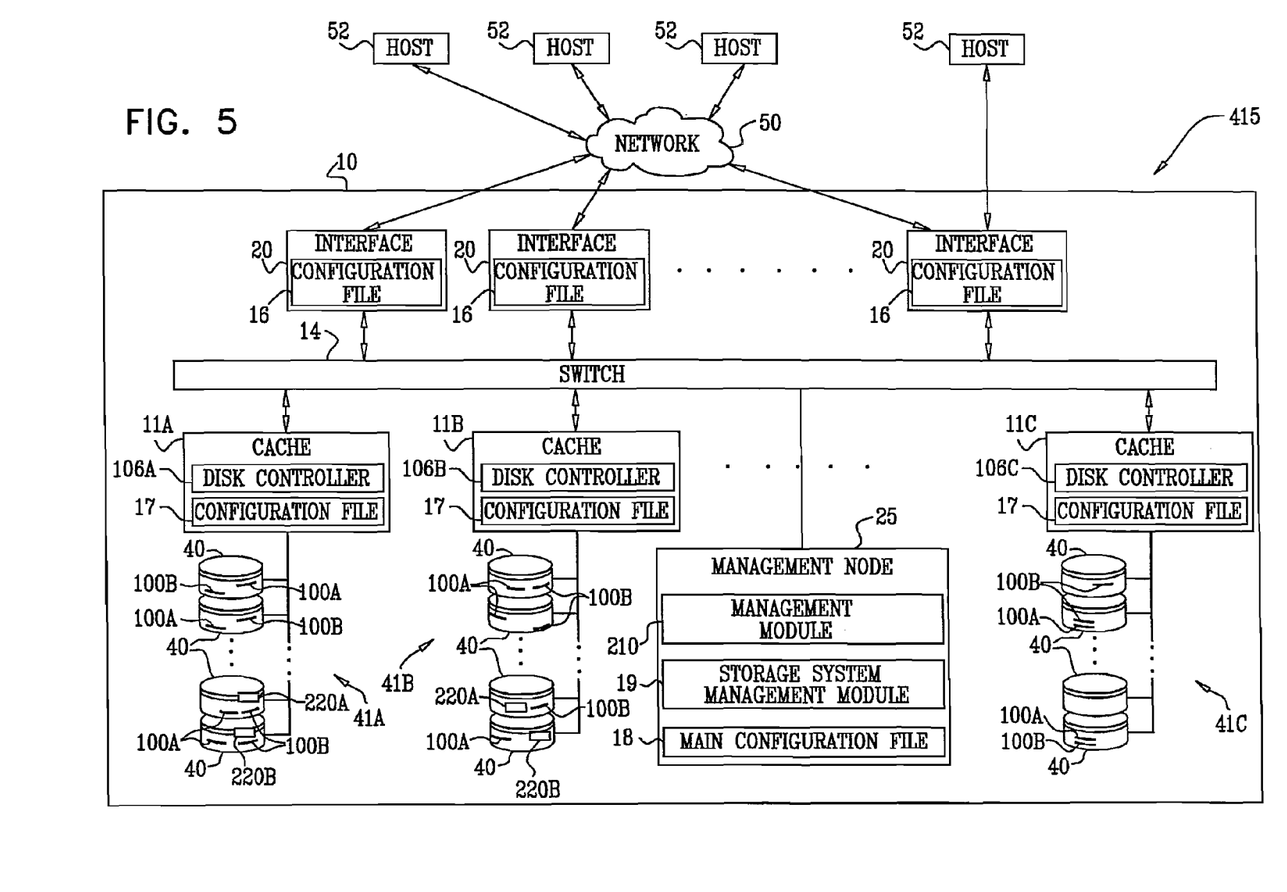
FIG. 5 is a block diagram illustration of an alternative distributed data storage system, according to an embodiment of the present invention.

FIG. 5 is a block diagram illustration of a distributed data storage system 415, according to an embodiment of the present invention. Apart from the differences described below, the operation of system 415 is generally similar to that of system 115 (FIG. 2), and elements indicated by the same reference numerals in both apparatus 415 and 115 are generally similar in construction and in operation.

System 415 comprises a VSP 220A and a VSP 220B, each of which are generally similar to VSP 220, so that a first set of storage resources are allocated to VSP 220A, and a second set of storage resources are allocated to VSP 220B.

Management mode 25 is generally as described above with respect to FIG. 3, comprising VSP and SSP management module 210, which in turn includes VSP and SSP processing module 216 and VSP and SSP logic module 212 (the latter are not shown in FIG. 5 for clarity).

Logic module 212 provides a first total storage capacity of storage resources used for VSP 220A, and also provides one or more volume-thresholds of the storage resources of VSP 220A. The module also provides second total storage capacity of storage resources used for VSP 220B, and also provides one or more volume-thresholds of the storage resources of VSP 220B. The volume-thresholds for VSP 220A and VSP 220B may be the same as each other, or may be different.

SSP 100A and VSP 220A may be associated, for example by being assigned to a first client or host. Similarly, SSP 100B and VSP 220B may be associated by being assigned to a second client or host. In these cases, transfer of storage resources between SSP 100A and VSP 220A, or between SSP 100B and VSP 220B, is substantially as described above for flowchart 300, so that storage resources are not transferred between clients or hosts. However, there is no requirement that transfer of resources be limited in this way. In this case the process of flowchart 300 may be adapted, by those having ordinary skill in the art, to accommodate transfer or reallocation of storage resources, on crossing of any predefined snapshot-threshold or volume-threshold, between any of SSP 100A, SSP 100B, VSP 220A, and VSP 220B. The transfer or reallocation may be according to any one or more of the criteria described above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or diagrams of methods, apparatus (systems) and computer program products according to embodiments of the invention. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or diagram block or blocks.

The flowcharts and diagrams in the figures illustrate the architecture, functionality, and operation of possible implementations of systems, methods and computer program products according to various embodiments of the present invention. In this regard, each block in the flowcharts or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flowchart illustrations, and combinations of blocks in the diagrams and/or flowchart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for data storage, comprising:
configuring, in a data storage system, a volume storage pool as data storage resources available for allocation to volumes and snapshots in the data storage system;
configuring, in the data storage system, a snapshot storage pool as data storage resources available for allocation to the volumes and the snapshots;
defining a volume threshold for the volume storage pool;
defining a snapshot threshold for the snapshot storage pool;
determining that at least one of the volume threshold and the snapshot threshold has been crossed;
in response to determining that the volume threshold has been crossed and that the snapshot threshold has not been crossed:
determining if the snapshot threshold will be crossed if data storage resources are allocated from the snapshot storage pool to the volume storage pool,
temporarily allocating data storage resources from the snapshot storage pool to the volume storage pool in response to determining that the snapshot threshold will not be crossed if the data storage resources are allocated from the snapshot storage pool to the volume storage pool, and
deleting one or more volumes from the volume storage pool or deleting one or more snapshots from the snapshot storage pool in response to determining that the snapshot threshold will be crossed if the data storage resources are allocated from the snapshot storage pool to the volume storage pool;
in response to determining that the snapshot threshold has been crossed and that the volume threshold has not been crossed:
determining if the volume threshold will be crossed if data storage resources are allocated from the volume storage pool to the snapshot storage pool,
temporarily allocating data storage resources from the volume storage pool to the snapshot storage pool in response to determining that the volume threshold will not be crossed if the data storage resources are allocated from the volume storage pool to the snapshot storage pool, and
deleting one or more volumes from the volume storage pool or deleting one or more snapshots from the snapshot storage pool in response to determining that the volume threshold will be crossed if the data storage resources are allocated from the volume storage pool to the snapshot storage pool; and
in response to determining that both the volume threshold and the snapshot threshold have been crossed:
deleting one or more volumes from the volume storage pool or deleting one or more snapshots from the snapshot storage pool, and
allocating data storage resources from the deleted one or more volumes to the snapshot storage pool or allocating data storage resources from the deleted one or more snapshots to the volume storage pool.

2. The method according to claim 1, wherein the volume threshold value comprises a function of at least one of a current amount of the data storage resources used for the volumes and a total storage capacity of the volume storage pool.

3. The method according to claim 2, wherein the function comprises a ratio of the current amount of the data storage resources used for the volumes and the total storage capacity of the volume storage pool.

4. The method according to claim 1, wherein the volume storage pool comprises a first volume storage pool, and wherein the action is selected from a group of actions comprising:
- deleting data corresponding to the data storage resources of at least one of the volume;
- reallocating of the data storage resources from a reserve storage pool; and
- reallocating of the data storage resources from a second volume storage pool different from the first volume storage pool.

5. The method according to claim 4, wherein deleting the data comprises selecting from a group of actions comprising:
- deleting the data corresponding to a predefined number of least-recently established volumes;
- deleting the data corresponding to a predefined number of most-recently established volumes;
- deleting the data corresponding to a predetermined number of volumes which are associated with a greatest amount of used storage resources;
- deleting the data corresponding to a predetermined number of volumes which are associated with a least amount of used storage resources;
- deleting the data corresponding to a predefined number of volumes that are associated with data that is being most frequently addressed with input/output (I/O) requests; and
- deleting the data corresponding to a predefined number of volumes that are associated with data that is being least frequently addressed with I/O requests.

6. The method according to claim 1, wherein defining the volume threshold value comprises defining different threshold values, and wherein performing the action comprises performing different respective actions in response to crossing of the different threshold values.

7. A method for data storage, comprising:
- configuring, in a data storage system, a volume storage pool as volume-data-storage-resources available for allocation to volumes and snapshots in the data storage system;
- configuring, in the data storage system, a snapshot storage pool as snapshot-data-storage-resources available for allocation to the snapshots and the volumes in the data storage system;
- defining a snapshot-threshold for the snapshot storage pool;
- defining a volume-threshold for the volume storage pool;
- determining that at least one of the snapshot-threshold and the volume-threshold has been crossed;
- in response to determining that the volume-threshold has been crossed and that the snapshot-threshold has not been crossed:
  - determining if the snapshot-threshold will be crossed if data storage resources are allocated from the snapshot-data-storage-resources to the volume-data-storage-resources,
  - temporarily allocating data storage resources from the volume-data-storage-resources to the snapshot-data-storage-resources in response to determining that the snapshot-threshold will not be crossed if the data storage resources are allocated from the snapshot-data-storage-resources to the volume-data-storage-resources, and
  - deleting a plurality of volumes from the volume-data-storage-resources or deleting a plurality of snapshots from the snapshot-data-storage-resources in response to determining that the snapshot-threshold will be crossed if the data storage resources are allocated from the snapshot-data-storage-resources to the volume-data-storage-resources;
- in response to determining that the snapshot-threshold has been crossed and that the volume-threshold has not been crossed:
  - determining if the volume-threshold will be crossed if data storage resources are allocated from the volume-data-storage-resources to the snapshot-data-storage-resources,
  - temporarily allocating data storage resources from the snapshot-data-storage-resources to the volume-data-storage-resources in response to determining that the volume-threshold will not be crossed if the data storage resources are allocated from the volume-data-storage-resources to the snapshot-data-storage-resources, and
  - deleting a plurality of volumes from the volume-data-storage-resources or deleting a plurality of snapshots from the snapshot-data-storage-resources in response to determining that the snapshot-threshold will be crossed if the data storage resources are allocated from the snapshot-data-storage-resources to the volume-data-storage-resources; and
- in response to determining that both the snapshot-threshold and the volume-threshold have been crossed:
  - deleting a plurality of volumes from the volume-data-storage-resources or deleting a plurality of snapshots from the snapshot-data-storage-resources, and allocating data storage resources from the deleted plurality of volumes to the snapshot-data-storage-resources or allocating data storage resources from the deleted plurality of snapshots to the volume-data-storage-resources.

8. Data storage apparatus, comprising:
- data storage devices configured to provide a volume storage pool as data storage resources available for allocation to volumes and snapshots in a data storage system and to provide a snapshot storage pool as data storage resources available for allocation to the volumes and the snapshots; and
- a management module configured to:
  - define a volume threshold value for the volume storage pool,
  - define a snapshot threshold value for the snapshot storage pool,
  - determine that at least one of the volume threshold and the snapshot threshold has been crossed,
  - in response to determining that the volume threshold has been crossed and that the snapshot threshold has not been crossed:
    - determine if the snapshot threshold will be crossed if data storage resources are allocated from the snapshot storage pool to the volume storage pool,
    - temporarily allocate data storage resources from the snapshot storage pool to the volume storage pool in response to determining that the snapshot threshold will not be crossed if the data storage resources are allocated from the snapshot storage pool to the volume storage pool, and
    - delete one or more volumes from the volume storage pool or delete one or more snapshots from the snapshot storage pool in response to determining that the snapshot threshold will be crossed if the data storage resources are allocated from the snapshot storage pool to the volume storage pool, in response to determining that the snapshot threshold has been crossed and that the volume threshold has not been crossed:
    determine if the volume threshold will be crossed if data storage resources are allocated from the volume storage pool to the snapshot storage pool,
    temporarily allocate data storage resources from the volume storage pool to the snapshot storage pool in response to determining that the volume threshold will not be crossed if the data storage resources are allocated from the volume storage pool to the snapshot storage pool, and
    delete one or more volumes from the volume storage pool or delete one or more snapshots from the snapshot storage pool in response to determining that the volume threshold will be crossed if the data storage resources are allocated from the volume storage pool to the snapshot storage pool, and
in response to determining that both the volume threshold and the snapshot threshold have been crossed:
    delete one or more volumes from the volume storage pool or delete one or more snapshots from the snapshot storage pool, and allocate data storage resources from the deleted one or more volumes to the snapshot storage pool or allocate data storage resources from the deleted one or more snapshots to the volume storage pool.

9. The apparatus according to claim 8, wherein the volume threshold value comprises a function of at least one of a current amount of the data storage resources used for the volumes and a total storage capacity of the volume storage pool.

10. The apparatus according to claim 9, wherein the function comprises a ratio of the current amount of the data storage resources used for the volumes and the total storage capacity of the volume storage pool.

11. The apparatus according to claim 8, wherein the volume storage pool comprises a first volume storage pool, and wherein the action is selected from a group of actions comprising:
    deleting data corresponding to the data storage resources of at least one of the volumes;
    reallocating of the data storage resources from a reserve storage pool; and
    reallocating of the data storage resources from a second volume storage pool different from the first volume storage pool.

12. The apparatus according to claim 11, wherein deleting the data comprises selecting from a group of actions comprising:
    deleting the data corresponding to a predefined number of least-recently established volumes;
    deleting the data corresponding to a predefined number of most-recently established volumes;
    deleting the data corresponding to a predetermined number of volumes which are associated with a greatest amount of used storage resources; deleting the data corresponding to a predetermined number of volumes which are associated with a least amount of used storage resources;
    deleting the data corresponding to a predefined number of volumes that are associated with data that is being most frequently addressed with input/output (I/O) requests; and
    deleting the data corresponding to a predefined number of volumes that are associated with data that is being least frequently addressed with I/O requests.

13. The apparatus according to claim 8, wherein defining the volume threshold value comprises defining different threshold values, and wherein performing the action comprises performing different respective actions in response to crossing of the different threshold values.

14. Data storage apparatus, comprising:
    data storage devices configured to provide a volume storage pool as volume-data-storage-resources available for allocation of volumes in a data storage system, and configured to provide a snapshot storage pool as snapshot-data-storage-resources available for allocation of snapshots in the data storage system; and
    a management module configured to:
        define a volume threshold value for the volume storage pool,
        define a snapshot threshold value for the snapshot storage pool,
        determine that at least one of the volume threshold value and the snapshot threshold value has been crossed,
        in response to determining that the volume threshold value has been crossed and that the snapshot threshold value has not been crossed:
            determine if the snapshot threshold value will be crossed if data storage resources are allocated from the snapshot storage pool to the volume storage pool,
            temporarily allocate data storage resources from the snapshot storage pool to the volume storage pool in response to determining that the snapshot threshold value will not be crossed if the data storage resources are allocated from the snapshot storage pool to the volume storage pool, and
            delete a plurality of volumes from the volume storage pool or delete a plurality of snapshots from the snapshot storage pool in response to determining that the snapshot threshold value will be crossed if the data storage resources are allocated from the snapshot storage pool to the volume storage pool,
        in response to determining that the snapshot threshold has been crossed and that the volume threshold has not been crossed:
            determine if the volume threshold value will be crossed if data storage resources are allocated from the volume storage pool to the snapshot storage pool,
            temporarily allocate data storage resources from the volume storage pool to the snapshot storage pool in response to determining that the volume threshold value will not be crossed if the data storage resources are allocated from the volume storage pool to the snapshot storage pool, and
            delete a plurality of volumes from the volume storage pool or delete a plurality of snapshots from the snapshot storage pool in response to determining that the volume threshold value will be crossed if the data storage resources are allocated from the volume storage pool to the snapshot storage pool, and
        in response to determining that both the volume threshold and the snapshot threshold have been crossed:
            delete a plurality of volumes from the volume storage pool or delete a plurality of snapshots from the snapshot storage pool, and
            allocate data storage resources from the deleted plurality of volumes to the snapshot storage pool or allocate data storage resources from the deleted plurality of snapshots to the volume storage pool.

15. A computer software product for operating a storage system, the product comprising a non-transitory computer-readable medium having program instructions recorded therein, which instructions, when read by a computer, cause the computer to:

configure, in a data storage system, a volume storage pool as data storage resources available for allocation to volumes and snapshots in the data storage system, configure, in the data storage system, a snapshot storage pool as data resources available for allocation to the volumes and the snapshots, define a volume threshold value for the volume storage pool, define a snapshot threshold value for the snapshot storage pool, determine that one of the volume threshold value and the snapshot threshold value has been crossed, in response to determining that the volume threshold value has been crossed and that the snapshot threshold value has not been crossed:

determine if the snapshot threshold value will be crossed if data storage resources are allocated from the snapshot storage pool to the volume storage pool, temporarily allocate data storage resources from the snapshot storage pool to the volume storage pool in response to determining that the snapshot threshold value will not be crossed if the data storage resources are allocated from the snapshot storage pool to the volume storage pool, and delete one or more volumes from the volume storage pool or delete one or more snapshots from the snapshot storage pool in response to determining that the snapshot threshold value will be crossed if the data storage resources are allocated from the snapshot storage pool to the volume storage pool, in response to determining that the snapshot threshold has been crossed and that the volume threshold has not been crossed:

determine if the volume threshold value will be crossed if data storage resources are allocated from the volume storage pool to the snapshot storage pool, temporarily allocate data storage resources from the volume storage pool to the snapshot storage pool in response to determining that the volume threshold value will not be crossed if the data storage resources are allocated from the volume storage pool to the snapshot storage pool, and delete one or more volumes from the volume storage pool or delete one or more snapshots from the snapshot storage pool in response to determining that the volume threshold value will be crossed if the data storage resources are allocated from the volume storage pool to the snapshot storage pool, and in response to determining that both the volume threshold and the snapshot threshold have been crossed:

delete one or more volumes from the volume storage pool or delete one or more snapshots from the snapshot storage pool, and allocate data storage resources from the deleted one or more volumes to the snapshot storage pool or allocate data storage resources from the deleted one or more snapshots to the volume storage pool.

16. The method according to claim 1, wherein the snapshot threshold value comprises a function of at least one of a current amount of the data storage resources used for the snapshots and a total storage capacity of the snapshot storage pool.

17. The method according to claim 16, wherein the volume threshold value comprises a function of at least one of a current amount of the data storage resources used for the volumes and a total storage capacity of the volume storage pool.

18. The apparatus according to claim 8, wherein the snapshot threshold value comprises a function of at least one of a current amount of the data storage resources used for the snapshots and a total storage capacity of the snapshot storage pool.

19. The apparatus according to claim 18, wherein the volume threshold value comprises a function of at least one of a current amount of the data storage resources used for the volumes and a total storage capacity of the volume storage pool.

20. The method according to claim 1, wherein deleting the one or more volumes from the volume storage pool or the deleting one or more snapshots from the snapshot storage pool in response to determining that the snapshot threshold will be crossed if the data storage resources are allocated from the snapshot storage pool to the volume storage pool or in response to determining that the volume threshold will be crossed if the data storage resources are allocated from the volume storage pool to the snapshot storage pool comprises deleting one or more snapshots from the snapshot storage pool and subsequently deleting one or more volumes from the volume storage pool.

21. The method according to claim 7, wherein deleting the plurality volumes from the volume-data-storage-resources or the deleting the plurality of snapshots from the snapshot-data-storage-resources in response to determining that the snapshot threshold will be crossed if the data storage resources are allocated from the snapshot-data-storage-resources to the volume-data-storage-resources or in response to determining that the volume threshold will be crossed if the data storage resources are allocated from the volume-data-storage-resources to the snapshot-data-storage-resources comprises deleting a plurality of snapshots from the snapshot-data-storage-resources and subsequently deleting a plurality of volumes from the volume-data-storage-resources.

* * * * *